Figure 1:
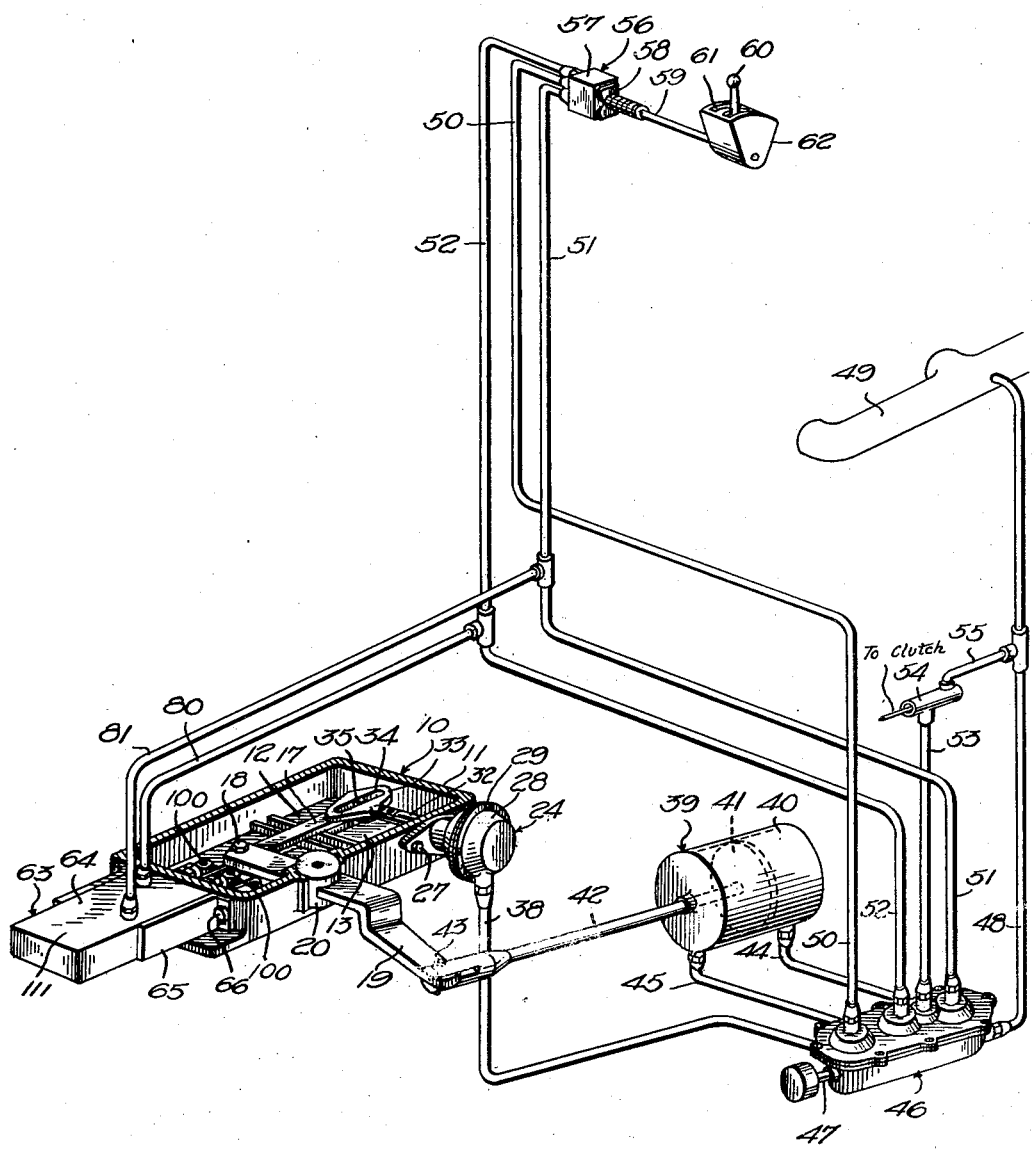

Aug. 15, 1939.   E. D. LASLEY   2,169,478
GEAR SHIFTING MECHANISM FOR MOTOR VEHICLES
Filed Nov. 13, 1936   3 Sheets-Sheet 1

Inventor
E. D. LASLEY

Aug. 15, 1939.  E. D. LASLEY  2,169,478
GEAR SHIFTING MECHANISM FOR MOTOR VEHICLES
Filed Nov. 13, 1936  3 Sheets-Sheet 2

Inventor
E. D. LASLEY
By C. L. Barker
Attorney

Aug. 15, 1939.   E. D. LASLEY   2,169,478
GEAR SHIFTING MECHANISM FOR MOTOR VEHICLES
Filed Nov. 13, 1936   3 Sheets-Sheet 3

Inventor
E. D. LASLEY
By
Attorney

Patented Aug. 15, 1939

2,169,478

UNITED STATES PATENT OFFICE 2,169,478

GEAR SHIFTING MECHANISM FOR MOTOR VEHICLES

Edward D. Lasley, Detroit, Mich., assignor to Automatic Shifters, Inc., Richmond, Va., a corporation of Virginia Application November 13, 1936, Serial No. 110,733

20 Claims. (Cl. 74—334)

This invention relates to gear shifting mechanisms for motor vehicles.

In the prior patent of Edward G. Hill and Henry W. Hey, No. 2,030,838, there is disclosed a gear shifting mechanism for motor vehicle transmissions wherein differential fluid pressure is employed as the power for effecting the shifting action. The mechanism of the patent referred to is highly advantageous in use for several reasons. For example, the main valve mechanism employed for controlling the application of fluid pressure is such as to assist in providing a relatively rapid shifting operation.

Moreover, the system of the patent referred to includes an auxiliary valve mechanism which functions to connect both ends of the main shifting motor to the atmosphere when the piston therein reaches intermediate or neutral position, thereby stopping the movement of the piston in such position, when desired. Such valve mechanism also functions to connect both ends of the main shifting motor to the source of pressure which is different from that of the atmosphere, for example, the intake manifold of the motor vehicle engine, when the piston reaches any gear position. This feature is of importance in providing a rapid shifting action in that it greatly facilitates subsequent shifting movements, as fully disclosed in the patent referred to.

More specifically, the auxiliary valve mechanism referred to functions to connect both ends of the main shifting motor to the intake manifold in each gear position, thus "vacuum suspending" the piston in each gear position. The subsequent admission of air to the end of the motor cylinder adjacent which the piston is arranged results in extremely rapid movement of the piston. The auxiliary valve mechanism is actuated in accordance with the extent to which the shifting operation takes place. In the patent referred to, the shifting mechanism is illustrated in conjunction with a so-called "square transmission" wherein each shifting movement takes place to the same extent. Accordingly a simple type of auxiliary valve may be employed to provide the vacuum suspension of the piston.

In some types of transmissions, for example, those in which gear synchronizing means is employed in connection with the second and high gear shift rail, the latter rail moves the same distance in both directions, while the low and reverse gear shift rod moves different distances in both directions but through a distance of travel greater than that of the second and high gear shift rail. To take care of such differential movements of the shift rails, an apparatus having a different type of auxiliary valve was developed, and such mechanism forms the subject matter of the copending application of Henry W. Hey, Serial No. 104,139, filed October 5, 1936. Such mechanism functions perfectly to provide vacuum suspension in the type of mechanism just referred to wherein two different distances of shift rail travel must be taken into consideration.

As distinguished from the transmission mechanisms referred to, a third general type of synchronizing transmission is now in use wherein each of the four conventional shifting movements takes place to a different extent. While the shifting mechanisms referred to function perfectly in connection with the transmissions for which they were designed, they will not function to provide vacuum suspension of the shifting motor of a gear shifting mechanism employed in connection with the general type of transmission wherein the various shifting movements take place to different extents.

An important object of the present invention is to provide a vacuum operated gear shifting mechanism having auxiliary control means associated therewith for effecting the vacuum suspension of the piston of the main shifting motor when the apparatus is employed with vehicle transmissions in which the various travels of the shift rails are different.

A further object is to provide an auxiliary control valve mechanism in an apparatus of this character comprising separate units operative by the respective shift rails and each functioning to provide vacuum suspension of the shifting motor piston regardless of the different distances of travel of the respective shift rails.

A further object is to provide an auxiliary control valve mechanism of the character described wherein each unit comprises a pair of separate valve elements each functioning upon movement of the shift rail in one direction to vacuum suspend the piston of the shifting motor when it reaches the desired gear position.

Other objects and advantages of the invention will become apparent during the course of the following description.

Figure 2:
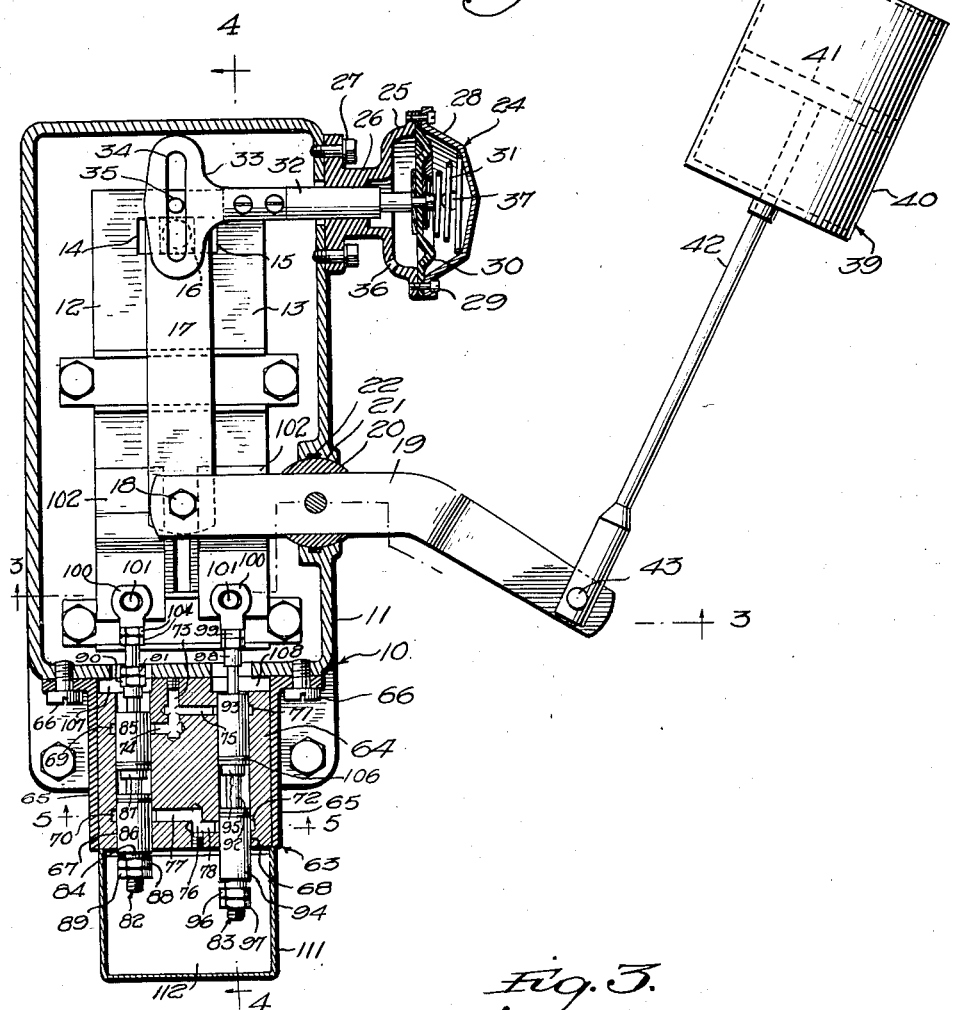
Figure 3:
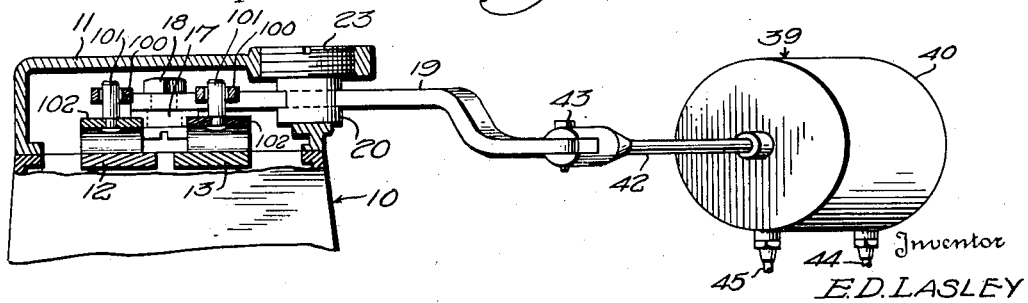
Figure 4:
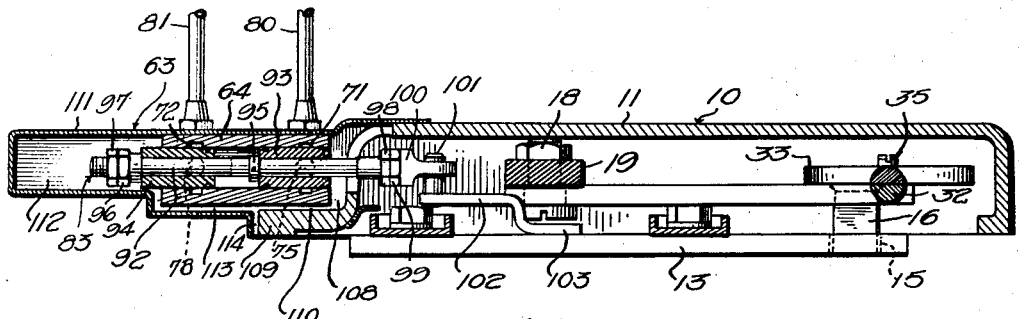
Figure 5:
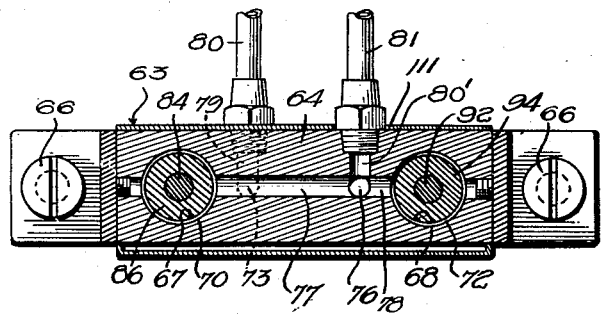
Figure 6:
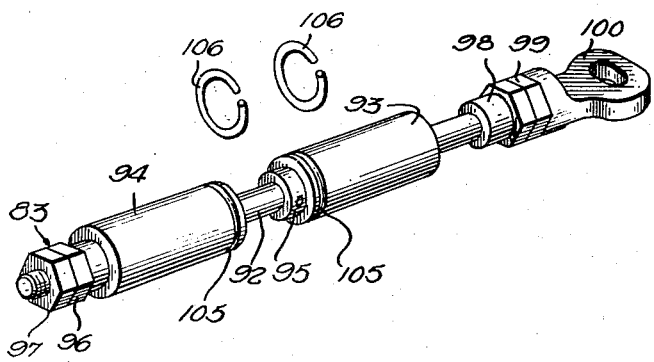

In the drawings I have shown one embodiment of the invention. In this showing:

Figure 1 is a perspective view of a portion of a motor vehicle gear set showing the shifting mechanism associated therewith, Figure 2 is a horizontal sectional view through the transmission cover plate, parts being shown in elevation, Figure 3 is a section on line 3—3 of Figure 2,
Figure 4 is a similar view on line 4—4 of Figure 2,
Figure 5 is a similar view on line 5—5 of Figure 2, and,
Figure 6 is a perspective view of one of the auxiliary valve units showing the friction rings detached.

Referring to Figures 1 and 2 the numeral 10 designates a motor vehicle transmission as a whole having a hollow cover plate 11 secured thereto, the top wall of the cover being cut away in Figure 1 to show the interior thereof. The transmission includes a second and high gear shift rail 12 and a first and reverse gear shift rail 13, these rails being conventional and being longitudinally movable to effect changes in the gear ratios of the transmission, as will be apparent.

The shift rails 12 and 13 are provided in their inner edges and adjacent the forward ends thereof with notches 14 and 15 respectively, and these notches are selectively engageable by a depending lug 16 carried by the forward end of an actuating link 17. The rear end of this link is pivotally connected as at 18 to the inner end of a horizontal shift lever 19. This lever is carried by a cylindrical member 20 mounted in a correspondingly shaped recess 21 in the cover plate 11, suitably packed as at 22 and closed by a plug 23, as shown in Figure 3. It will be apparent that the lever 19 rocks with the cylindrical member 20 to effect movement of the shift link 17.

A crossover motor indicated as a whole by the numeral 24 is operative for determining the engagement of the lug 16 with the respective notches 14 and 15. The crossover motor comprises an inner circular casing section 25 preferably formed integral with a bearing 26, and this bearing is secured as at 27 to the side of the transmission cover 11. A second casing section 28 has its peripheral portion secured as at 29 to the casing section 25, and a flexible diaphragm 30 is interposed between the two casing sections. A spring 31 biases the diaphragm 30 toward the left as viewed in Figure 2 for a purpose to be described.

A shaft 32 is secured at its inner end to the diaphragm 30 and is slidable in the bearing 26. The inner end of the shaft 32 is provided with a head 33 having a relatively long slot 34 extending longitudinally of the transmission and receiving a vertically extending pin 35 carried by the shifting link 17. It will be apparent that sliding movement of the shaft 32 in the bearing 26 transmits movement through the pin 35 to the shifting link 17 to engage the lug 16 in either of the notches 14 or 15. It also will be apparent that the pin 35, moving lengthwise in the slot 34, permits actuation of the shifting link 17 to effect longitudinal movement of the shift rails 12 and 13.

The casing section 25 is vented to the atmosphere as at 36, while the casing section 28 is provided with a port 37 to which is connected a pipe 38. This pipe is controlled in a manner to be described for connecting the casing 28 to the atmosphere or to a source of vacuum. When the pipe 38 is connected to the atmosphere it will be apparent that the spring 31 moves the shaft 32 to the left as viewed in Figure 2, thus biasing the lug 16 into engagement with the notch 14. The connection of the pipe 38 to the source of vacuum moves the shaft to the right as viewed in Figure 2 to engage the lug 16 with the notch 15. The crossover motor thus provides means for selecting the shift rails 12 and 13 for actuation upon operation of the lever 19.

A main shifting motor 39 is employed for actuating the lever 19. This motor comprises a cylinder 40 having a reciprocable piston 41 mounted therein and connected to one end of a piston rod 42. This piston rod extends through one head of the cylinder 40 and is pivotally connected at its free end to the lever 19, as at 43. As is customary in devices of this character, the cylinder 40 is suitably supported to permit it to partake of a slight relative movement incident to the swinging of the lever 19.

The perspective view in Figure 1 is taken looking toward the forward end of the motor vehicle, and the forward and rear ends of the cylinder 40 are connected to pipes 44 and 45, respectively. These pipes, together with the pipe 38, lead to a main control valve mechanism 46, which may be identical with the valve mechanism disclosed in Patent No. 2,030,838, referred to above. The valve mechanism 46 is provided with an air intake pipe 47, and is also provided with a vacuum pipe 48 leading to the intake manifold 49 of the motor vehicle.

The valve mechanism 46 includes three valves for controlling connection of the pipes 38, 44 and 45 to the atmosphere or to the intake manifold, and each of these valves is controlled by a fluid pressure device, in accordance with the disclosure of the patent referred to. These fluid pressure devices, in turn, are controlled by pipes 50, 51 and 52, which are respectively operative for controlling the pipes 38, 44 and 45. A fourth pipe 53 leads to the top of the valve mechanism 46 and is connected to a clutch operated valve 54. A pipe 55 leads from this valve to the vacuum pipe 48. The valve 54 functions to prevent the connection of the pipes 44 and 45 to the atmosphere when the clutch is in engagement, thus preventing the shifting of the gears except upon disengagement of the clutch. The valve 54 forms no part of the present invention but is disclosed and claimed in the copending application of Edward G. Hill and Henry W. Hey, Serial No. 43,104, filed October 1, 1935.

The pipes 50, 51 and 52 lead to a manual selector valve mechanism 56. This mechanism may be identical with the corresponding mechanism disclosed in Patent No. 2,030,838 referred to above. Such mechanism comprises a valve body 57 having ports communicating with the pipes 51 and 52, which are controlled by the rocking of a valve 58. This valve is splined to a shaft 59, and accordingly this shaft is adapted to rock the valve 58 to selectively connect the pipes 51 and 52 to the atmosphere. The shaft 59 is also slidable to the left as viewed in Figure 1 to open a suitable port to connect the pipe 50 to the atmosphere. The shaft 59 carries a selector handle 60 operating in an H-slot 61 formed in the upper arcuate face of a segmental housing 62. It will become apparent that the handle 60 moves in the slot 61 to positions corresponding to the positions of a conventional gear shift lever, and movement of the handle 60 results in the shifting of the transmission in the same manner as such operations are performed upon corresponding movements of a conventional gear shift lever.

In accordance with the disclosure of Patent No. 2,030,838, discussed above, the admission of air into the pipes leading to the selector valve mechanism results in connecting the corresponding shift motor and crossover motor pipes to the intake manifold. For example, if the handle 60 is moved to the left and rearwardly, as viewed in Figure 1, the pipes 50 and 52 will be connected to the atmosphere, in which case the corresponding pipes 38 and 45 will be connected to the vacuum pipe 48. Under such conditions, the shift will be made into low gear. If the handle 65 is subsequently moved forwardly and to the right from low gear position, the pipes 50 and 52 will be disconnected from the atmosphere, while the pipe 51 will be connected to the atmosphere. Under such conditions, the pipe 44, controlled by the pipe 51, will be connected to the vacuum pipe 48, while the pipes 38 and 45, which are controlled by the pipes 50 and 52, will be connected to the atmosphere. Under such conditions, the shift will be made into second gear. In accordance with the disclosure of the patent referred to, therefore, the connection of one of the selector valve pipes to the atmosphere results in the connection of its corresponding pipes 38, 44 or 45 to the intake manifold. Similarly, the disconnection of either of the selector valve pipes from the atmosphere results in establishing atmospheric pressure in the corresponding pipe 38, 44 or 45.

An auxiliary valve mechanism is employed for controlling the connection of the pipes 51 and 52 to the atmosphere independently of the selector valve mechanism, to provide atmospheric pressure in both ends of the cylinder 40 to stop the shift in neutral position, and to vacuum suspend the piston 41 in any gear position. Such auxiliary valve mechanism thus performs the functions of the valve mechanism shown in Figures 8, 9 and 10 of the patent referred to, except that it performs such functions regardless of the distance of travel of the shift rails 12 and 13. In this connection, it is assumed that the transmission illustrated in the present case is of the type wherein each shifting movement of the shift rails takes place to a different extent, and the auxiliary control valve mechanism employed with the present apparatus compensates for such differences in the travels of the shift rails.

The auxiliary control valve mechanism is illustrated in detail in Figures 2, 4, 5 and 6, the mechanism as a whole being indicated by the numeral 63. The auxiliary valve mechanism comprises a valve housing 64 of the cross-sectional shape indicated in Figure 5, and one end of this valve housing is arranged adjacent the rear end wall of the transmission cover 11. The valve housing is secured in any suitable manner between parallel brackets 65 which have their inner ends secured as at 66 to the forward end wall of the transmission housing. The housing 64 is provided with a pair of bores 67 and 68 in which are arranged valve units to be described. The bore 67 is provided adjacent opposite ends with annular passages 69 and 70, while the bore 68 is similarly provided adjacent opposite ends with annular passages 71 and 72.

At one end, the housing 64 is provided with a longitudinal passage 73, and transverse passages 74 and 75 communicate between the passage 73 and the respective annular passages 69 and 71. The other end of the housing 64 is provided with a longitudinal passage 76 having transverse branch passages 77 and 78 communicating with the respective annular passages 70 and 72. The longitudinal passages 73 and 76 are respectively provided with vertical passages 79 and 80', respectively, and these vertical passages, in turn, are respectively connected to pipes 80 and 81. Referring to Figure 1, it will be noted that the pipes 80 and 81 are connected to the respective pipes 52 and 51, for a purpose to be described.

Valve units indicated as a whole by the numerals 82 and 83 are mounted in the respective bores 67 and 68. The valve unit 82 comprises a stem 84 on which are slidable a pair of valves 85 and 86. The stem 84 is provided intermediate its ends with a collar or flange 87 engageable with the inner ends of the valves 85 and 86 to transmit movement thereto. Rearwardly of the valve 86, the stem 84 is provided with a nut 88, fixed in position by a lock nut 89 and engageable with the valve 86 upon forward movement of the stem 84. Similarly, the stem 84 is provided forwardly of the valve 85 with a nut 90, fixed by a lock nut 91, and engageable with the forward end of the valve 85 upon rearward movement of the stem 84.

The valve unit 83 is very similar to the valve unit 82, and comprises a stem 92 having valves 93 and 94 slidable thereon and engageable by a collar or flange 95 carried by the valve stem 92 between the valves 93 and 94. The rear end of the stem 92 is provided with a nut 96, fixed in position by a jamb nut 97 and engageable with the rear end of the valve 94 upon forward movement of the stem 92. Similarly, the stem 92 is provided forwardly of the valve 93 with a nut 98, fixed in position by a lock nut 99, and engageable with the forward end of the valve 93 upon rearward movement of the stem 92.

Each of the valve stems 84 and 92 is provided at its forward end with a connecting member 100 slotted to receive an upstanding pin 101. These pins are carried by the forward ends of the small bracket members 102, the forward ends 103 of such members being secured to the respective shift rods 12 and 13. Accordingly it will be apparent that the stems of the valve units are actuated upon movement of the respective shift rails.

It also will become apparent that since movement of the first and reverse gear shift rail 13 takes place to a greater extent than the second and high gear shift rail 12, greater travel of the valve stem 92 must be provided for than is true of the stem 84. Accordingly the nuts 98 and 99 are mounted close to the associated connector 100, the nut 99 acting as a jamb nut for securing the stem 92 to the connector 100. However, the nuts 90 and 91 are arranged rearwardly of the associated connector 100, in view of the shorter length of travel of the stem 94, and accordingly separate means is provided for connecting the stem 84 to its connecting member 100, such as the nuts 104.

The individual valves 85, 86, 93 and 94, are intended to remain stationary except when definitely actuated by the collars 87 or 95, or the actuating nuts 88, 90, 96 or 98. In order to insure that the individual valves referred to will remain stationary except when positively actuated, friction means is preferably provided for each valve, each of the valves 85, 86, 93 and 94 being provided with a groove 105 in which is arranged a split ring 106. This arrangement is clearly shown in connection with the valves 93 and 94 in Figure 6 of the drawings. It will be apparent that the respective valve elements are freely slidable in their bores 67 and 68, but the frictional engagement of the rings 106 in the bores referred to prevents movement of the valves except when positively actuated.

The central portion of the forward end of the valve housing 64 preferably engages solidly against the rear wall of the transmission cover 11. On opposite sides of such central portion, the forward end of the valve body 64 is recessed as at 107 and 108 to provide spaces communicating with the forward ends of the respective bores 67 and 68. Referring to Figure 4 it will be noted that the rear wall of the transmission cover has a lower rearwardly projecting extension 109 spaced from the valve body 64 as at 110. The space 110 obviously communicates with the spaces 107 and 108.

A casing 111 is provided for the auxiliary valve mechanism, such casing extending a substantial distance rearwardly of the valve body 64 to provide a space 112 for rearward movement of the valve units 82 and 83. The lower wall of the casing 111 extends beneath the valve casing 64 and is spaced therefrom as at 113. The forward end of the lower wall of the casing 111 turns downwardly adjacent the rear edge of the extension 109 and is spaced therefrom as at 114. It will be apparent that the forward and rear ends of the bores 67 and 68 thus communicate with the atmosphere.

The operation of the apparatus is as follows:

Except for the auxiliary valve mechanism 63 and the clutch operated valve 54, the apparatus operates in accordance with the disclosure of Patent No. 2,030,838. The clutch valve 54 functions in accordance with the disclosure of the copending application of Henry W. Hey, Serial No. 104,139, also referred to above. The function of the valve 54 is to admit air into the fluid pressure devices which control the pipes 44 and 45, when the vehicle clutch is in engagement. This operation would be the same as opening the pipes 51 and 52 to the atmosphere, and thus these pipes are not subject to control by the selector valve mechanism, and accordingly the latter is inoperative for providing a shifting action when the clutch is in engagement. When the clutch is disengaged, the valve 54 opens the pipe 53 to the intake manifold through pipes 55 and 48, in which case the valve mechanism 46 is subject to control by the selector valve mechanism exactly in accordance with the patent referred to. The valve 54 forms no part of the present invention, but its use is desirable for the reason that it affords vacuum suspension of the piston 41 in either gear position when the clutch is engaged as well as when it is disengaged.

When it is desired to start the vehicle from a standstill, assuming that the transmission is in neutral, the operator may disengage the clutch and move the selector handle 60 to the left and rearwardly. This operation rocks the valve 58 to connect the pipe 52 to the atmosphere, and slides the shaft 59 longitudinally to open the pipe 50 to the atmosphere. The latter operation functions through the proper elements of the main valve mechanism 46 to connect the pipe 38, and thus the crossover motor casing 28 (Figure 2) to the intake manifold. The diaphragm 30 will move against the tension of the spring 31 to slide the shaft 32 toward the right as viewed in Figure 2 and thus swing the shifting link 17 to bring the lug 16 into engagement with the notch 15 of the first and reverse gear shift rail 13.

Rearward movement of the selector handle 60 will have opened the pipe 52 to the atmosphere, as previously stated, and this operation results in connecting the pipe 45 and the rear end of the cylinder 40 to the intake manifold, the forward end of the cylinder 40 remaining in communication with the atmosphere. Thus the piston 41 will move rearwardly to swing the lever 19 and transmit forward movement to the shift link 17, and hence to the shift rail 13. This operation moves the gear set to low gear position in accordance with the disclosure of the patent referred to.

As previously stated, the movement of the piston 41 to effect the shift into low gear is accomplished by connecting the pipe 45 to the source of vacuum and the pipe 44 to the atmosphere. When the low and reverse gear shift rail 13 moves forwardly, the collar 95 (Figure 2) engages the rear end of the valve 93 and moves it forwardly, assuming the valves 93 and 94 to have been initially in the positions shown in Figure 2. The forward movement of the shift rail 13 likewise will cause the nut 96 to engage the rear end of the valve 94 and move it forwardly. The movement of the shift rail 13 continues until the low gear position is reached, in which position the valve 93 will retain the annular port 71 closed, while the valve 94 will have opened the annular port 72 to the atmosphere through the rear end of the bore 68. At such time therefore air will flow through passages 78 and 76, (Figure 2), vertical passage 80', (Figure 5), and pipe 81, and thus air will be admitted into the pipe 51 which previously was closed by the selector valve 58. The admission of air into the pipe 51 operates the proper elements of the control valve mechanism 46 to connect the pipe 44 to the intake manifold and thus the piston 41 will be vacuum suspended adjacent the gear end of the cylinder 40 with the transmission in low gear.

Upon the completion of the shift into low gear, the operator may engage the vehicle clutch and open the engine throttle to start the vehicle in motion. When the desired vehicle speed has been attained, the shift into second gear may be made by releasing the clutch and moving the selector handle 60 forwardly and to the right to the second gear position. It will be recalled that in the low gear position, the pipe 52 was connected to the atmosphere at the selector valve, while the pipe 51 was connected to the atmosphere through the annular port 72 rearwardly of the valve 94. Upon movement of the selector handle to second gear position, the previously opened pipe 52 is closed to the atmosphere, while the pipe 51 is opened to the atmosphere at the selector valve. Accordingly the latter pipe is opened to the atmosphere both at the selector valve and at the auxiliary valve 94. The closing of the pipe 52 to the atmosphere results in the connection of the pipe 45 to the atmosphere, and the piston 41 will start immediately to move forwardly.

The sliding movement of the shaft 59 upon movement of the handle to the right at neutral position will have closed the pipe 50 to the atmosphere, thus establishing atmospheric pressure in the crossover motor casing 28, thus releasing the spring 31 to tend to move the forward end of the shift link 17 toward the left. Such movement is prevented until neutral position is reached, and when such position is reached incident to the forward movement of the piston 41, as described, the lug 16 will be promptly transferred from the notch 15 to the notch 14 of the second and high gear shift rail 12. Continued forward movement of the piston 41 will move the shift link 17 rearwardly, transmitting similar movement to the shift rail 12 to effect the shift into second gear.

The rearward movement of the shift rail 13 out of low gear position will cause the nut 98 and collar 95 to engage and move the respective valves 93 and 94 rearwardly, after the lost motion has been taken up between the nut 98 and collar 95 and their respective valves. This movement causes the valve 94 to close communication between the annular port 72 and the atmosphere and does not transmit sufficient movement to the valve 93 to open the port 71 to the atmosphere through the forward end of the bore 68. Accordingly both of the annular ports 71 and 72 will be closed to the atmosphere at the time the shift is transferred from the rail 13 to the rail 14.

The continued forward movement of the piston 41 beyond neutral position effects rearward movement of the shift rail 12 into second gear position, in the manner stated, and such movement causes the collar 87 (Figure 2) to move the valve 86 rearwardly while the nut 90 transmits similar movement to the valve 85. When second gear position is reached, the valve 85 will uncover the annular port 69 to the atmosphere through the forward end of the valve bore 67.

When second gear position is reached, therefore, air will be admitted through the passages 69, 74 and 73 (Figure 2) and thence through the vertical passage 79 (Figure 3) and pipe 80, which leads to the control pipe 52, as shown in Figure 1. In the second gear position of the selector handle 60, the pipe 51 was opened to the atmosphere, while the pipe 52 was closed to the atmosphere. This resulted in the connection of the forward and rearward ends of the cylinder 40 to the intake manifold and the atmosphere, respectively, whereby the piston 41 was caused to move to a point adjacent the forward end of the cylinder 40 to effect the shift into second gear. When such position was reached, air was admitted into the pipe 52 through the pipe 80, in the manner stated, and the resulting functioning of the valve mechanism 46 will have connected the pipe 45 to the intake manifold, thus vacuum suspending the piston 41 in the second gear position.

The shift into high gear is then made by depressing the clutch pedal and moving the selector handle 60 rearwardly while retaining it at the right side of the H-slot 61. The crossover motor 24 accordingly will be unaffected, but the turning of the valve 58 will close the pipe 51 to the atmosphere, while opening the pipe 52 to the atmosphere. This operation results in the shifting of the piston 41 in the same manner as described in connection with the shift into low gear. When the shift is made into high gear, however, the lug 16 of the shift link 17 will remain in engagement with the notch 14, and accordingly the second and high gear shift rail will be moved forwardly throughout its length of travel to effect the shift from second into high gear.

Whereas the annular port 69 will have been opened to the atmosphere through the forward end of the bore 67 when the transmission was in second gear, the forward movement of the shift rail 12 will cause the collar 87 and nut 88 to initially take up play between themselves and the valves 85 and 86, respectively. As the shift rail 12 reaches neutral position the collar 87 will have moved the valve 85 to a position closing the annular passage 69, and as the shift into high gear is completed, the nut 88 will move the valve 86 past the port 70 to open this port to the atmosphere through the rear end of the bore 67.

When the high gear position is reached, therefore, air will flow through the rear end of the bore 67 and thence (Figures 2 and 5) through passages 70, 77, 76 and 80', and pipe 81 to the pipe 51, which will have been closed upon movement of the selector handle 60 to high gear position. The admission of air into the pipe 51 accordingly connects the forward end of the cylinder 40 to the intake manifold when the piston 41 reaches its rearward position to complete the shift into high gear, and thus this piston again will be vacuum suspended.

Assuming that the shift is to be made into reverse gear, the selector handle will be moved to the left and forwardly, to a position corresponding to the reverse position of the conventional gear shift lever. This action is accompanied by longitudinal sliding movement of the selector valve shaft 59, and this action is followed by the movement of the shift link lug 16 into the notch 15 in the manner described in connection with the shift into low gear. The forward movement of the handle 60 to reverse gear position opens the pipe 51 to the atmosphere while retaining the pipe 52 closed to the atmosphere, and accordingly the forward and rear ends of the shifting motor cylinder 40 will be respectively connected to the source of vacuum and to the atmosphere in the same manner as for the shift into second gear. Accordingly the piston 41 will move forwardly and will transmit rearward movement to the first and reverse shift rail 13.

The rearward movement of the shift rail 13 causes the nut 98 and collar 95 to transmit movement to the valves 93 and 94 respectively, and when the reverse gear position is reached, the valve 93 will open the annular passage 71 (Figure 2) to the atmosphere through the forward end of the valve bore 68. Under such conditions, air will flow through passages 71, 75 and 73 (Figure 1) thence through the vertical passage 79 (Figure 5) and pipe 80 to the pipe 52, which was closed to the atmosphere at the selector valve when the handle was shifted into reverse gear position. The admission of air into the pipe 52 connects the rear end of the cylinder 40 to the intake manifold, thus vacuum suspending the piston 41 adjacent the forward end of the cylinder 40 in reverse gear position.

Regardless of the gear position in which the transmission is arranged, the movement of the selector handle 60 to neutral position will result in stopping the shifting elements in neutral position with atmospheric pressure present on both sides of the piston 41. For example, if the selector handle 60 is in the high gear position, the piston 41 will be arranged adjacent the rear end of the cylinder 40 and the second and high gear shift rod 12 will be arranged forwardly of the position shown in Figure 2, in high gear position. Under such conditions, the valve 86 (Figure 2) will be arranged in its forward position connecting the annular passage 70 to the atmosphere to maintain the piston 41 vacuum suspended in high gear position. At the same time, the remaining annular passages 69, 71 and 72 will be maintained closed by their respective valves 85, 93 and 94.

Under the conditions referred to, both ends of the cylinder 40 will be connected to the intake manifold with the piston 41 arranged adjacent the rear end of the cylinder. Upon movement of the handle 60 to neutral position, the selector valve 58 will assume a position closing both of the pipes 51 and 52 to the atmosphere at the selector valve. However, the pipe 51 will be in communication with the atmosphere through pipe 81 (Figures 1 and 5) and passages 80', 76, 77 and 70 and the rear end of the valve bore 67. Therefore, while the selector valve 58 is effective for closing the pipe 52 to the atmosphere, the pipe 51 will remain in communication with the atmosphere. Accordingly the forward end of the cylinder 40 will remain in communication with the intake manifold, while the rear end of this cylinder will be connected to the atmosphere incident to the closing of the pipe 52 to the atmosphere.

Thus when the selector handle 60 is moved to the neutral position from high gear position, the piston 41 will immediately start to move forwardly, and the second and high gear shift rail 12 will move rearwardly. This movement continues until the collar 87 (Figure 2) moves the valve 86 to close the annular passage 70 to communication with the atmosphere, and accordingly the pipe 51 will be disconnected from the atmosphere when neutral position is reached. This action results in opening the pipe 44 and the forward end of the cylinder 40 to the atmosphere, and movement of the piston 41 thus will be arrested when neutral position is reached.

The operation of moving to neutral position from any of the other gear positions is similar to the operation just described, the only difference being that, depending upon the particular gear position, one of the annular passages 69, 71 or 72 will be opened to the atmosphere, and the associated valve will close such annular passage when neutral position is reached.

It will be apparent that the present apparatus contemplates the use of a valve element for each of the four positions of a conventional gear set and these valve elements are independent of each other as distinguished from the neutralizing and vacuum suspending of the valve devices of Patent No. 2,030,838 and copendng application Serial No. 104,139, previously referred to. This arrangement permits the use of valve elements 85, 86, 93 and 94 of different lengths, and likewise permits the use of valve operating stems 84 and 92 of different effective lengths. That is, the nuts 88 and 90 and the nuts 96 and 98 may be arranged any desired distance from their respective collars 87 and 95. Accordingly any desired valve travel of the auxiliary valves may be provided, depending upon the distance of travel of the shift rails for each individual gear position.

In the structure of Patent No. 2,030,838 and copending application Serial No. 104,139, the neutralizing and vacuum suspending valve devices comprise an integral valve which moves in accordance with the shifting movement transmitted to the selected shift rail. In the present case, it is desired to compensate for the different distances of travel partaken of by each of the shift rails, and for this reason the neutralizing and vacuum suspending valves are actuated by the shift rails themselves.

With the earlier constructions referred to, leverage could be taken advantage of for the purpose of reducing the travel of the neutralizing and vacuum suspending valves, whereas in the present case, the corresponding valves, if made integral as in the previous cases, would move greater distances due to their direct actuation by the shift rails. It is for this reason that the valves 85, 86, 93 and 94 are loosely mounted on their respective stems with the provision of lost motion between the stems and valves. It will be noted that although the stems of the neutralizing valves move relatively great distances, the valves themselves move substantially shorter distances, and this distance may be predetermined according to the lost motion between the stems and valves in order that the latter may move the proper distance from their vacuum suspending positions to their neutralizing positions. In other words, these valves are in vacuum suspending positions when they are arranged to open their respective annular ports through the ends of the valve cylinders, and are in their neutralizing positions when they cover their respective annular passages. For the proper operation of the mechanism, the distance of travel of each valve between such two positions should be relatively short. This operation is provided in the present construction and facilitates the accuracy of the operation of the apparatus.

Thus it will be apparent that the present apparatus is applicable to transmissions in which all of the distances of travel of the shift rails for the different gear positions are different, thus permitting vacuum suspension of the shifting piston 41 to be accomplished in transmissions of the type referred to. The vacuum suspension of the piston is highly advantageous because of the extreme rapidity of operation which has been found to be inherent with such an arrangement. The present apparatus, as will be apparent, is likewise adaptable for use with a "square transmission" or a transmission wherein each of the shift rails partakes of the same movement in opposite directions but wherein the movement of each shift rail is different from the movement of the other. This adaptability is permissible through the use of auxiliary valves of different lengths and the use of valve operating stems 84 and 92 of different effective lengths, such variation in the parts of the auxiliary valve mechanism thus providing vacuum suspension in any type of conventional transmission. The apparatus is particularly intended, however, for use in connection with transmissions wherein each shifting movement takes place through a different distance of travel.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A gear shifting mechanism for a motor vehicle having a transmission provided with a plurality of shifting members movable different distances to provide different gear ratios, comprising means for selecting said members for actuation, a motor for actuating the selected shifting member, means for controlling the operation of said motor, and a plurality of auxiliary control devices each connected for actuation by one of said shifting members and connected and arranged with respect to said motor and said shifting members for deenergizing said motor when the selected shifting member reaches neutral position, each auxiliary control device having a portion operable when one of said shifting members reaches a gear position for deenergizing said motor.

2. A gear shifting mechanism for a motor vehicle having a transmission provided with a plurality of shifting members movable different distances to provide different gear ratios, comprising means for selecting said members for actuation, a motor for actuating the selected shifting member, means for controlling the operation of said motor, an actuating element connected to each of said shifting members, and a pair of control elements mounted on each actuating element and respectively operable upon movement of the corresponding shifting member in opposite directions, said control elements being connected and arranged with respect to said motor and said shifting members for deenergizing said motor when the selected shifting member reaches neutral position.

3. A gear shifting mechanism for a motor vehicle having a transmission provided with a plurality of shifting members movable different distances to provide different gear ratios, comprising means for selecting said members for actuation, a differential fluid pressure motor for actuating the selected shifting member, means for effecting the generation of differential pressures in said motor to actuate the selected shifting member, and a plurality of auxiliary control devices each connected for actuation by one of said shifting members and connected and arranged with respect to said motor and said shifting members for equalizing pressures in said motor when the selected shifting member reaches a predetermined position, each auxiliary control device having a portion operable when one of said shifting members reaches a gear position for equalizing pressures in said motor.

4. A gear shifting mechanism for a motor vehicle having a transmission provided with a plurality of shifting members movable different distances to provide different gear ratios, comprising means for selecting said members for actuation, a differential fluid pressure motor for actuating the selected shifting member, means for effecting the generation of differential pressures in said motor to actuate the selected shifting member, an actuating element connected to each of said shifting members, and a pair of control elements mounted on each actuating element and respectively operable upon movement of the corresponding shifting member in opposite directions, said control elements being connected and arranged with respect to said motor and said shifting members for equalizing pressures in said motor when the selected shifting member reaches a predetermined position.

5. A gear shifting mechanism for a motor vehicle having a transmission provided with a plurality of shifting members movable different distances to provide different gear ratios, comprising means for selecting said members for actuation, a differential fluid pressure motor for actuating the selected shifting member, means for effecting the generation of differential pressures in said motor to actuate the selected shifting member, a valve housing having ports therein, and a plurality of auxiliary control valve devices operable in said valve housing, each control valve device being connected for actuation by one of said shifting members and being connected and arranged with respect to said motor and said shifting members for controlling said ports for equalizing pressures in said motor when the selected shifting member reaches a predetermined position.

6. A gear shifting mechanism for a motor vehicle having a transmission provided with a plurality of shifting members movable different distances to provide different gear ratios, comprising means for selecting said members for actuation, a differential fluid pressure motor for actuating the selected shifting member, means for effecting the generation of differential pressures in said motor to actuate the selected shifting member, a valve housing having ports therein connected to control pressures in said motor, an actuating element connected to each of said shifting members, and a pair of control valves in said housing mounted on each actuating element and respectively operable upon movement of the corresponding shifting member, said control valves being connected and arranged with respect to said shifting members and said ports to control said ports for equalizing pressures in said motor when the selected shifting member reaches a predetermined position.

7. A gear shifting mechanism for a motor vehicle having a transmission provided with a plurality of shifting members movable different distances to provide different gear ratios, comprising means for selecting said members for actuation, a motor for actuating the selected shifting member, means for controlling the operation of said motor, an actuator connected to each of said shifting members and movable therewith, and a pair of control elements having lost motion connection with each of said actuators to reduce the travel of said control elements with respect to said actuators, said control elements being operable by said actuators and being constructed and arranged with respect to said motor and said shifting members for effecting deenergization of said motor when the selected shifting member reaches a predetermined position.

8. A gear shifting mechanism for a motor vehicle having a transmission provided with a plurality of shifting members movable different distances to provide different gear ratios, comprising means for selecting said members for actuation, a motor for actuating the selected shifting member, means for controlling the operation of said motor, an actuator connected to each of said shifting members and movable therewith, a pair of control elements having lost motion connection with each of said actuators to reduce the travel of said control elements with respect to said actuators, said control elements being operable by said actuators and being constructed and arranged with respect to said motor and said shifting members for effecting deenergization of said motor when the selected shifting member reaches a predetermined position, and means frictionally resisting movement of said control elements.

9. A gear shifting mechanism for a motor vehicle having a transmission provided with a plurality of shifting members movable different distances to provide different gear ratios, comprising means for selecting said members for actuation, a differential fluid pressure motor for actuating the selected shifting member, means for effecting the generation of differential pressures in said motor to actuate the selected shifting member, an actuator connected to each of said shifting members and movable therewith, and a pair of valves having lost motion connection with each of said actuators to reduce the travel of said valves with respect to said actuators, said valves being movable by said actuators and being constructed and arranged with respect to said motor and said shifting members for effecting equalization of pressures in said motor when the selected shifting member reaches a predetermined position.

10. A gear shifting mechanism for a motor vehicle having a transmission provided with a plurality of shifting members movable different distances to provide different gear ratios, comprising means for selecting said members for actuation, a differential fluid pressure motor for actuating the selected shifting member, means for effecting the generation of differential pressures in said motor to actuate the selected shifting member, a valve housing having ports therein connected for controlling pressures in said motor, an actuator connected to each shifting member, and a pair of valves in said housing operable by the respective actuators and constructed and arranged with respect to said shifting members and said ports for controlling said ports to effect equalization of pressures in said motor when the selected shifting member reaches a predetermined position, said valves having lost motion connection with said actuators to reduce their travel with respect to the travel of said actuators.

11. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, and a pair of control valves operable by each shifting member and connected for effecting a change in pressure in one of said conduits, said control valves being connected and arranged with respect to said conduits and said shifting members to cause said controlling means to equalize pressures in said motor when the selected shifting member reaches a predetermined position.

12. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, an actuator connected to each shifting member, and a pair of valves operable by each actuator and connected for effecting a change in pressure in one of said conduits, said control valves being connected and arranged with respect to said conduits and said shifting members to cause said controlling means to equalize pressures in said motor when the selected shifting member reaches a predetermined position, said valves having lost motion connection with said actuators to reduce the travel of said valves with respect to the travel of said actuators.

13. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, a valve housing having ports communicating with said conduits, and a pair of valves operable by each shifting member and adapted to control pressures in said conduits through said ports, said pair of valves being connected and arranged with respect to said ports and said shifting members to effect pressure equalization in said motor when the selected shifting member reaches a predetermined position.

14. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, a valve housing having ports communicating with said conduits, and a pair of valves operable by each shifting member and adapted to control pressures in said conduits through said ports, said pair of valves being connected and arranged with respect to said ports and said shifting members to effect pressure equalization in said motor when the selected shifting member reaches a predetermined position, said valves having lost motion connection with said shifting members to reduce the travel of said valves with respect to the travel of said shifting members.

15. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, a pair of control valves operable by each shifting member and connected for effecting a change in pressure in one of said conduits, said control valves being connected and arranged with respect to said conduits and said shifting members to cause said controlling means to equalize pressures in said motor when the selected shifting member reaches a predetermined position, lost motion means connecting said valves to said shifting members, and means frictionally resisting movement of said valves.

16. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, a valve housing having a pair of valve bores provided with ports communicating with said conduits, a pair of valves in each valve bore having lost motion connection with one of said shifting members and operable thereby, said pair of valves being connected and arranged with respect to said ports and said shifting members through said ports, for effecting a change in pressure in one of said conduits to cause said controlling means to equalize pressures in said motor when the selected shifting member reaches a predetermined position, and means frictionally resisting movement of said valves.

17. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, an actuator connected to each shifting member, a pair of valves slidable on each actuator and positively movable thereby and connected for effecting a change in pressure in one of said conduits, said pair of valves being constructed and arranged with respect to said conduits and said shifting members to cause said controlling means to equalize pressures in said motor when the selected shifting member reaches a predetermined position, and means frictionally resisting movement of said control valves.

18. A gear shifting mechanism for a motor vehicle having a transmission provided with a plurality of shifting members movable different distances to provide different gear ratios, comprising means for selecting said members for actuation, a differential pressure motor for actuating the selected shifting member, means for controlling the operation of said motor including a pair of fluid conduits connected to control pressures in said motor and a manual selector valve for determining the pressures in said conduits, a valve housing having a pair of bores provided with ports communicating with said conduits, a pair of valves mounted in each bore, an actuator for each pair of valves connected to each of said shifting members, said actuators being slidable in said valves and having portions engaging said valves to positively actuate them, said pair of valves being constructed and arranged with respect to said ports and said shifting members to control said ports and effect a change in pressure in one of said conduits to cause said controlling means to equalize pressures in said motor when the selected shifting member reaches a predetermined position, and a ring surrounding each valve and frictionally engaging within the associated valve cylinder to resist movement of said valves.

19. A gear shifting mechanism for a motor vehicle having a transmission provided with a plurality of shifting members movable different distances to provide different gear ratios, comprising means for selecting said members for actuation, a differential fluid pressure motor connected for actuating the selected shifting member, a main control valve mechanism, a pair of pipes connected between said valve mechanism and the respective ends of said motor, a pair of valves in said valve mechanism connected for controlling pressures in the respective pipes, fluid pressure operated means for controlling said valves, a pair of conduits connected for controlling said last named means, a manual selector valve for controlling pressures in said conduits, and a pair of valves connected for controlling pressures in each of said conduits, said last named pairs of valves being operable by said shifting members and constructed and arranged with respect to said conduits and said shifting members for equalizing pressures in said conduits and accordingly in said motor when the selected shifting member reaches a predetermined position.

20. A gear shifting mechanism for a motor vehicle having a transmission provided with a plurality of shifting members movable different distances to provide different gear ratios, comprising means for selecting said members for actuation, a differential fluid pressure motor connected for actuating the selected shifting member, a main control valve mechanism, a pair of pipes connected between said valve mechanism and the respective ends of said motor, a pair of valves in said valve mechanism connected for controlling pressures in the respective pipes, fluid pressure operated means for controlling said valves, a pair of conduits connected for controlling said last named means, a manual selector valve for controlling pressures in said conduits, a pair of valves connected for controlling pressures in each of said conduits, and lost motion means connecting each of said last named pair of valves to one of said shifting members to reduce the movement of such valves with respect to said shifting members, said last named pairs of valves being connected and arranged with respect to said shifting members and said conduits to equalize pressures in said conduits and accordingly in said motor when the selected shifting member reaches a predetermined position.

EDWARD D. LASLEY.